United States Patent [19]
Lee

[11] 3,873,838
[45] Mar. 25, 1975

[54] TWO-DIMENSIONAL READOUT SYSTEM FOR RADIATION DETECTOR

[75] Inventor: Lap Yen Lee, Houston, Tex.

[73] Assignee: The United States of America as represented by the United States Atomic Energy Commission, Washington, D.C.

[22] Filed: Apr. 22, 1974

[21] Appl. No.: 463,017

[52] U.S. Cl................................. 250/366, 250/368
[51] Int. Cl. ............................................ G01t 1/20
[58] Field of Search ............ 250/361, 362, 366, 368

[56] References Cited
UNITED STATES PATENTS

| 3,717,762 | 2/1973 | Grenier et al.................... 250/366 |
| 3,717,767 | 2/1973 | Gold et al........................ 250/366 |
| 3,812,361 | 5/1974 | Prag et al........................ 250/366 |

*Primary Examiner*—Archie R. Borchelt
*Attorney, Agent, or Firm*—Dean E. Carlson; David S. Zachry; David E. Breeden

[57] ABSTRACT

A two-dimensional readout system has been provided for reading out locations of scintillations produced in a scintillation type radiation detector array wherein strips of scintillator material are arranged in a parallel planar array. Two sets of light guides are placed perpendicular to the scintillator strips, one on the top and one on the bottom to extend in alignment across the strips. Both the top and bottom guides are composed of a number of 90° triangular prisms with the lateral side forming the hypotenuse equal to twice the width of a scintillator strip. The prism system reflects light from a scintillation along one of the strips back and forth through adjacent strips to light pipes coupled to the outermost strips of the detector array which transmit light pulses to appropriate detectors to determine the scintillation along one axis. Other light pipes are connected to the end portions of the strips to transmit light from the individual strips to appropriate light detectors to indicate the particular strip activated, thereby determining the position of a scintillation along the other axis. The number of light guide pairs may be equal the number of the scintillation strips when equal spatial resolution for each of the two coordinates is desired. When the scintillator array detects an event which produces a scintillation along one of the strips, the emitted light travels along four different paths, two of which are along the strip, and two of which are through the light guide pair perpendicular to the strips until all four beams reach the outer edges of the array where they may be transmitted to light detectors by means of light pipes connected therebetween according to a binary code for direct digital readout.

4 Claims, 3 Drawing Figures

TWO-DIMENSIONAL READOUT SYSTEM FOR RADIATION DETECTOR

The present invention was made during the course of, or under, a contract with the United States Atomic Energy Commission.

REFERENCES

U.S. Pat. application Ser. No. 304,863, filed Nov. 8, 1972, in the name of Lap Yen Lee for "Hodoscope Readout System," now U.S. Pat. No. 3,777,161, issued Dec. 4, 1973, and having a common assignee with the present invention.

BACKGROUND OF THE INVENTION

This invention relates generally to radiation multidetector readout systems and more specifically to a multidetector readout system for reading out locations of scintillations produced in scintillation detector arrays.

In radiation multidetector devices, especially for spatial radiation detection, it is common practice to monitor spatial radiation detection systems by separate detection channels for each resolution element or area of an array. Individual events in discrete portions of a detector array are sensed individually by separate detection channels and fed into a memory device by means of an X-Y coordinate address register. As pointed out in the above-referenced U.S. patent application, this straightforward technique requires a number of detection channels at least equal to the number of increments of resolution along the X and Y axis of the detector array.

The referenced application provides a system by which the X and Y coordinates of an event may be read out in digital form in a manner which requires a minimum number of readout channels for direct digital storage of the location of radiation events within a two-dimensional detectory array. With this direct digital readout system it is only necessary that the signals from an event be located with respect to the position along each axis, that is, the light signals from a scintillation produced in an array of scintillators must be transmitted to the outer edges of the array while maintaining their position along each axis. At this point the light signals are transmitted through light pipes to appropriate light detectors for direct digital coding.

As pointed out in the referenced application when using scintillation strips disposed in a plane parallel array, the light pipes may be connected to the ends of each strip to locate the particular strip detecting an event, thereby locating the position of an event along one axis. The position along the orthogonal axis may be located by stacking another array of scintillation strips identical to the first array but positioned orthogonally thereto so that the radiation being detected must pass through and interact with both arrays to locate the position along two axes. In the measurement of low energy particles, it is difficult, if not impossible, to construct two-layer arrays which will allow detection of low energy particles in both layers. In the measurement of gamma rays, the radiation interacts with the material by either photoelectric effect or Compton scattering. In the former case, light will be produced only in one of the layers, and in the latter case, the probability of having two successive Compton scatterings, one in each layer, is small. Therefore, it is desirable to construct scintillator arrays with only one layer to improve the sensitivity and thus the position resolution, especially for the application of gamma radiation detection.

One method set forth in the referenced application to provide X and Y coordinate readout from a single layer array of scintillator strips detected the light signals at the ends of each strip to determine the particular strip activated by an event, thereby locating the event along one axis across the array, while measuring the difference in arrival time of the light pulse at opposite ends of the activated strip to determine the position along the strip, thereby locating the event along the other axis. This method requires accurate electron timing circuitry which not only complicates the system, but adds additional cost as well. Further, to obtain accurate timing measurements each light pipe connected between the scintillator strips and the light detectors must be accurately cut to the exact same length to prevent timing errors.

Another method described in the referenced application determines the coordinate position along a scintillator strip by separately summing the signal amplitudes of the light detectors connected to receive the light transmitted through the light pipes from opposite ends of the scintillator strips and algebraically determines the position by means of analog circuits. This method again requires additional electronic circuits which complicate the detection system.

SUMMARY OF THE INVENTION

In view of the above limitations in spatial radiation detection with single layer scintillator arrays, it is an object of this invention to provide a two-dimensional readout system for radiation detector arrays composed of a plurality of scintillator strips disposed in a plane parallel array in which light guides are provided to transmit scintillation light pulses from a scintillation along one of the strips to a corresponding position at the outermost strips of the array where they are then transmitted to detectors which indicate the point of the scintillation along the strip, thereby indicating the event position along one axis. The location along the other axis is determined by sensing light pulses at the ends of the scintillator strips. Two sets of light guides are placed perpendicular to the scintillation strips, one on the top and one on the bottom, for each resolution area along the strips. Each light guide consists of a plurality of right triangular prisms with lateral sides opposite the 90° angle (the hypotenuse) equal to twice the width or any even multiple of the width of a scintillation strip. These sides of the prisms are bonded to the top and bottom surfaces of the strips with the bottom set of prisms displaced one-half of the hypotenuse with respect to the top set of prisms so that a light pulse from an event within one of the strips is reflected back and forth through adjacent strips to the outermost strips where it is picked up by light pipes to be transmitted to an appropriate detector.

Other objects and many of the attendant advantages of the present invention will be obvious from the following detailed description taken in conjunction with the drawings.

DETAILED DESCRIPTION

Figure 1:
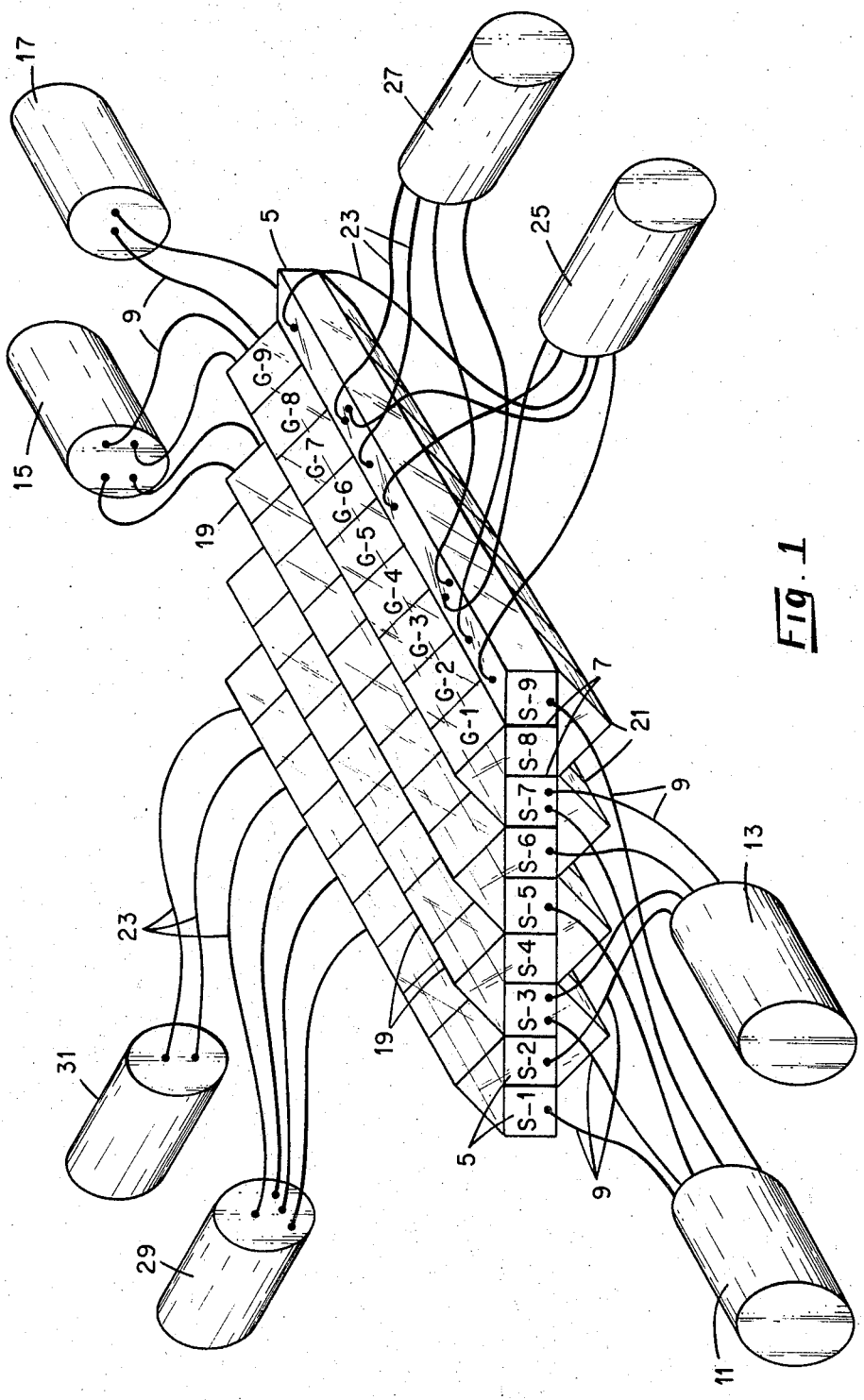
FIG. 1 is a pictorial view, partially schematic, of a two-dimensional radiation detector array readout system according to the present invention.

Referring now to FIG. 1, there is shown a detector array in the form of a plurality of scintillator strips 5. Although only nine strips, numbered S-1 through S-9, are shown to illustrate the invention, it will be understood from the following description that any number of scintillator strips may be read out in a similar manner, as described hereinbelow.

The strips 5, which may be cut from various known scintillator materials which emit light when struck by ionizing radiation or upon the absorption of high energy electromagnetic radiation, are disposed in a parallel planar array with a light opaque barrier between adjacent strips to isolate scintillations within the strip activated by an event. The opaque barrier may be in the form of a thin aluminum foil strip 7 bonded between each strip, as shown in FIG. 1, leaving the top, bottom, and end surfaces open to transmit light.

A first plurality of light pipes 9, illustrated as single lines, is connected between the ends of the scintillator strips and the light-sensitive face of four photomultiplier tubes 11 through 17 in a manner to provide a direct digital readout for one coordinate of the array, as will be explained hereinbelow. To provide an identical readout for the other coordinate, at least two sets of light guides 19 and 21 are disposed perpendicular to the strips 5, one on the top 19 and one on the bottom 21. Depending upon the degree of spatial resolution required along the strips 5, the light guides may be equal in length to the length of the strips or divided into equal resolution area lengths, as shown in FIG. 1, typically equal to the width of a scintillator strip 5 when equal spatial resolution for each of the two coordinate is desired.

Figure 2:
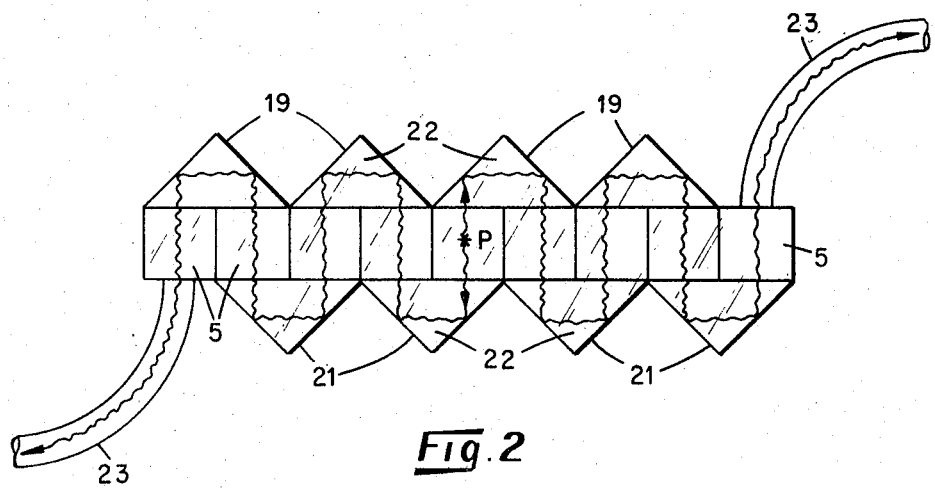
FIG. 2 is a sectional view of the detector of FIG. 1.

Referring now to FIG. 2, there is shown schematically a typical cross section of the detector array of FIG. 1. As shown, the two sets of light guides 19 and 21 for a resolution distance along the strips 5 each consist of a plurality of Porro (triangular 90°) prisms 22 with the lateral side forming the hypotenuse having a width equal to twice the width of a scintillator strip 5. The prisms 22 forming the light guide 21 has a displacement of half of the hypotenuse with respect to the top light guide set of prisms 19. The prisms may be bonded to the scintillator strips 5 with optical cement of closely matching refractive index. The material of the light guide is chosen to be transparent to the scintillation radiation and with an index of refraction greater than 1.42. The index of refraction should be close or equal to the index of refraction of the scintillator material, if the latter is greater than 1.42.

A second plurality of light pipes 23 is connected along the two outer strips 5 to view the light directed through the outer strips S-1 and S-9 from the light guides. As shown, the light pipes are connected to the face of the outer strips opposite the last prism of the respective light guide. The other ends of the light pipes 23 are connected to the light-sensitive areas of four photomultiplier tubes 25 through 31 in the same manner as the first group of light pipes 9.

When a scintillator strip is struck by radiation which produces a scintillation event, as indicated by the point P in FIG. 2, the emitted light travels along four different paths, two of which are along the length of the particular strip, and two of which are shown as the wavy lines in FIG. 2, a cut-out section along the light guide where the scintillation P occurred. Light pulses which travel along a scintillator strip are picked up by some of the PM tubes numbered PM-11 through PM-17, transmitted thereto according to the scheduled connections of the first plurality of light pipes 9 to produce a binary code output for the X-coordinate as set forth in Table I.

TABLE I

| X-Position No. | Binary Code | Connections of Light Pipes (9) | | | |
|---|---|---|---|---|---|
| | | PM-17 (1000) | PM-15 (0100) | PM-13 (0010) | PM-11 (0001) |
| 1 | (0001) | | | | S-1 |
| 2 | (0010) | | | S-2 | |
| 3 | (0011) | | | S-3 | S-3 |
| 4 | (0100) | | S-4 | | |
| 5 | (0101) | | S-5 | | S-5 |
| 6 | (0110) | | S-6 | S-6 | |
| 7 | (0111) | | S-7 | S-7 | S-7 |
| 8 | (1000) | S-8 | | | |
| 9 | (1001) | S-9 | | | S-9 |

The connection scheme according to Table I is a very simple way of obtaining a digital code readout and illustrates how any number of strips may be added to the array and connected to PM tubes for a binary code output locating the event along an axis of the array. More details on the illustrated connection scheme and alternate connection patterns may be had by referring to the above-referenced U.S. application.

The light pulses which travel along the wave guide sets, as illustrated in FIG. 2, undergo multiple total reflections along the multiple prism light guide system and enter the coded light pipe system 23 to be transmitted to some of the PM tubes 25-31 according to the scheduled connections of the light pipes 23 to produce a binary code output for the Y-coordinate as set forth in Table II. The light guide sets (19 and 21) are identified by the reference characters G-1 through G-9 in FIG. 1.

TABLE II

| Y-Position No. | Binary Code | Connections of Light Pipes (23) | | | |
|---|---|---|---|---|---|
| | | PM-31 (1000) | PM-29 (0100) | PM-27 (0010) | PM-25 (0001) |
| 1 | (0001) | | | | G-1 |
| 2 | (0010) | | | G-2 | |
| 3 | (0011) | | | G-3 | G-3 |
| 4 | (0100) | | G-4 | | |
| 5 | (0101) | | G-5 | | G-5 |
| 6 | (0110) | | G-6 | G-6 | |
| 7 | (0111) | | G-7 | G-7 | G-7 |
| 8 | (1000) | G-8 | | | |
| 9 | (1001) | G-9 | | | G-9 |

Figure 3:
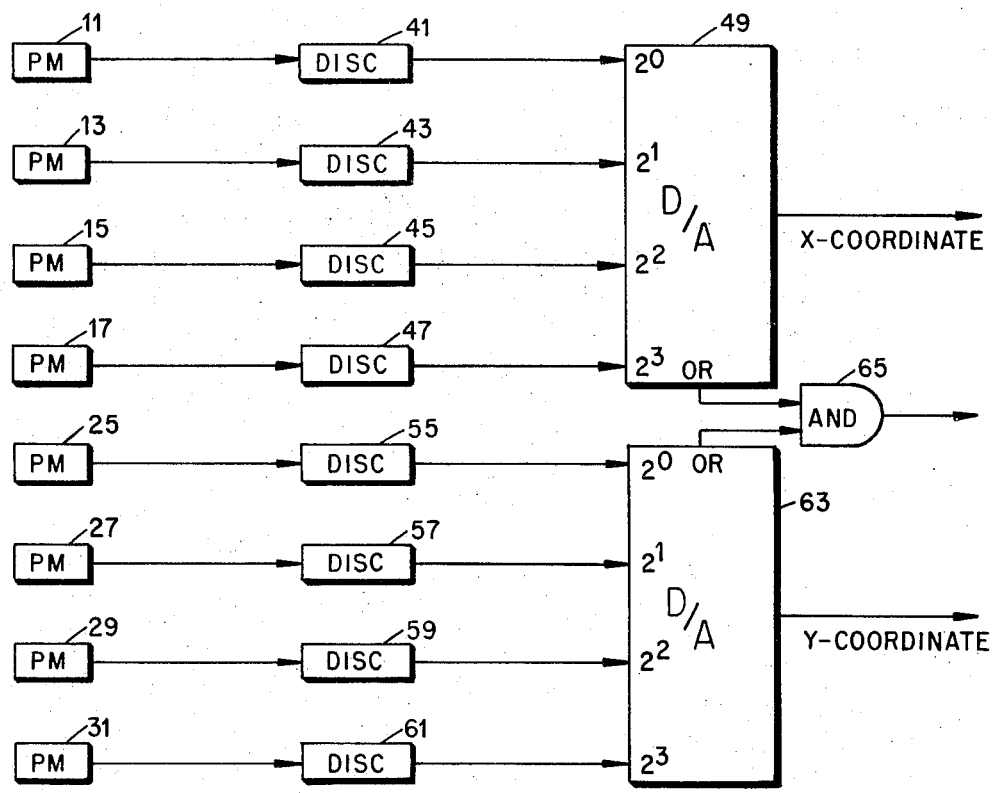
FIG. 3 is a block diagram of an output circuit which may be used with the system of FIG. 1.

The outputs from all of the PM tubes may be read directly into a digital storage means or converted to an analog signal as illustrated in FIG. 3. The outputs of the PM tubes for both the X and Y coordinates of FIG. 1 are connected, respectively, to the inputs of a corresponding number of pulse discriminator circuits 41 through 47 for the X axis PM tubes 11 through 17 and 55 through 61 for the Y axis PM tubes 25 through 31. The discriminators connect the approximately 100 millivolt spike at the output of an activated PM tube to a 10-nanosecond, 1-volt pulse which can be used to trigger either a digital storage device or a digital-to-analog converter as illustrated in FIG. 3. The outputs of discriminators 41 through 47 are connected, respectively, to the $2^0$ through $2^3$ binary coded inputs of one digital-to-analog converter 49 to obtain an analog signal whose amplitude is indicative of the position of an event along the X-axis of the detector array. The outputs of discriminators 55 through 61 are connected, respectively, to the $2^0$ through $2^3$ binary coded inputs of another digital-to-analog converter 63 to obtain a corresponding analog signal indicative of the position of the event along the Y-axis. The outputs of the converters 49 and 63 may be used in various conventional ways to display the position information. For example, the X and Y coordinate outputs may be connected to corresponding inputs of an X-Y oscilloscope (not shown). To prevent false recordings which may be caused by PM tube noise, a coincidence requirement between the signals from the X and Y coordinates may be added by connecting the OR'ed inputs from the converters 49 and 63 to respective inputs of an AND gate 65. The output of AND gate 65 may be used to enable an X-Y recorder or trigger the sync input of an X-Y oscilloscope.

In summmary, it will be seen that a means has been provided for two-dimensional direct-digital readout of a rectangular single layer scintillation detector array which provides light pulses from scintillations at specific points within the array to corresponding positions along the four edges of the array. The light pulses from an event are seen to travel in four directions, two along the activated scintillator strip 5 and two through multiple reflection paths confined to sets of light guides 19 and 21 disposed in alignment across the array at right angles to the strip alignment. The light pulses travel across the array of strips by means of multiple total reflections along the multiple prism light guide system and enter the coded light pipe system 23, while the light pulses traveling along the activated strip 5 enter the coded light pipe system 9. The light pulses are then sensed by the photomultiplier tubes which are connected to the light pipe systems to provide a binary code input to the recording system indicative of the position of an event within the array.

Since only binary signals are used, the pulse-height of the scintillation or energy release of an event is unimportant in position determination. However, when it is desired to detect radiation of a particular energy, the pulse-height information may be restored by using a linear adder which adds up all the linear signals from all the PM tubes used. As pointed out in the above-referenced application, only 2n PM tubes are required to handle $2^n-1$ by $2^n-1$ location or resolution areas within the detector array. That is, 12 PM tubes are needed for a 63 × 63 position detector, 63 scintillation strips and 63 light guide sets.

This system may be used as a radiation camera by placing the detector in the focal plane of a pin-hole or multi-hole radiation collimator of conventional form. The detector is capable of detecting up to $10^8$ quanta of particles per second which is very desirable for high flux intensity monitoring or imaging.

Although the invention has been described by way of example of the preferred form, it will be obvious to those skilled in the art that various changes in the details of the construction and combination and arrangement of parts may be resorted to without departing from the spirit and scope of the invention as set forth in the claims which form a part of this application.

What is claimed is:

1. A two-dimensional readout system for reading out locations of scintillations produced in a single layer array of scintillators for spatial detection of nuclear radiation, comprising:
   a plurality of uniform width scintillator strips disposed in a parallel planar array to form a block having opposing parallel radiation-receiving surfaces;
   a plurality of sets of light guides disposed adjacent said strips on said opposing surfaces of said block in adjacent rows perpendicular to said strips so that like rows at said opposite surfaces of said block are aligned and form one of said sets of light guides each of which includes,
   a plurality of Porro prisms aligned in a corresponding one of said rows across said strips and having their lateral side forming the hypotenuse bonded to said strips so as to overlap substantial portions of adjacent strips and aligned so as to reflect light produced by a scintillation in one of said strips back and forth progressively through adjacent strips to the outermost oppositely disposed strips to indicate the row in which a scintillation occurred within said block; and
   means responsive to light pulses received at the ends of said strips and the ends of said rows of light guides for indicating the position of a scintillation within said array produced by a radiation event detected within said scintillator array.

2. The system of claim 1 further comprising a plurality of light opaque barriers disposed between adjacent ones of said scintillator strips so as to prevent light transmissions within the plane of said array in a direction perpendicular to said strips.

3. The system of claim 2 wherein each of said prisms has a width equal to twice the width of one of said scintillator strips and a length equal to the desired spatial resolution along said rows.

4. The system as set forth in claim 3 wherein said prisms forming one of said sets of light guides are aligned so that the prisms disposed on one of said opposing surfaces of said block are offset by a distance equal to the width of one of said strips with respect to the prisms disposed on the other of said opposing surfaces of said block so that light pulses from a scintillation occurring in a row along one of said strips undergo multiple total reflections along the multiple prism light guide sets to the opposite ends of the corresponding row.

* * * * *